US009860851B2

(12) United States Patent
Zhou et al.

(10) Patent No.: US 9,860,851 B2
(45) Date of Patent: Jan. 2, 2018

(54) MANAGING ACCESS TO TRANSMISSION MEDIUM IN A WIRELESS ENVIRONMENT

(71) Applicant: QUALCOMM Incorporated, San Diego, CA (US)

(72) Inventors: Yan Zhou, San Diego, CA (US); Gwendolyn Denise Barriac, Encinitas, CA (US); Simone Merlin, San Diego, CA (US); Sameer Vermani, San Diego, CA (US); Rahul Tandra, San Diego, CA (US); Bin Tian, San Diego, CA (US); Hemanth Sampath, San Diego, CA (US); Vincent Knowles Jones, IV, Redwood City, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 182 days.

(21) Appl. No.: 13/782,866

(22) Filed: Mar. 1, 2013

(65) Prior Publication Data
US 2014/0247774 A1    Sep. 4, 2014

(51) Int. Cl.
*H04W 4/00* (2009.01)
*H04W 52/24* (2009.01)
*H04W 16/10* (2009.01)

(52) U.S. Cl.
CPC ......... *H04W 52/243* (2013.01); *H04W 16/10* (2013.01)

(58) Field of Classification Search
CPC .............................. H04W 52/243; H04W 16/10
USPC ............... 370/230, 252, 254, 329, 331, 447; 455/453
See application file for complete search history.

(56) References Cited

U.S. PATENT DOCUMENTS

| 5,717,688 | A | * | 2/1998 | Belanger | ................ | H04B 1/713 370/331 |
|---|---|---|---|---|---|---|
| 6,944,446 | B1 | | 9/2005 | Kubler et al. | | |
| 7,801,096 | B2 | | 9/2010 | Myles et al. | | |
| 7,957,355 | B1 | * | 6/2011 | Heiferling | ............. | H04W 40/12 370/338 |
| 7,961,639 | B2 | | 6/2011 | Lee | | |
| 8,107,950 | B2 | * | 1/2012 | Amirijoo | .......... | H04W 36/0083 455/423 |
| 2003/0087645 | A1 | * | 5/2003 | Kim | ...................... | H04W 28/16 455/453 |
| 2003/0212941 | A1 | * | 11/2003 | Gillies | ................ | H04L 12/2697 714/726 |
| 2003/0214914 | A1 | * | 11/2003 | Cain | .................... | H04B 7/0491 370/252 |

(Continued)

OTHER PUBLICATIONS

Jiang L.B., et al., "Hidden-Node Removal and Its Application in Cellular WiFi Networks," IEEE Transactions on Vehicular Technology, Sep. 2007, vol. 56 (5), pp. 2641-2654.

*Primary Examiner* — Chirag Shah
*Assistant Examiner* — Jael Ulysse
(74) *Attorney, Agent, or Firm* — Arent Fox LLP

(57) ABSTRACT

An apparatus and method for managing interference in a transmission medium are disclosed. A apparatus and method may be used to detect a condition experienced by only one of first and second wireless nodes, and modify an operational parameter of one of the first and second wireless nodes, if the condition is detected, such that both the first and second wireless nodes experience the condition or neither the first and second wireless nodes experience the condition.

30 Claims, 9 Drawing Sheets

100

FIRST COVERAGE
REGION
114

SECOND COVERAGE
REGION
224

(56) References Cited

U.S. PATENT DOCUMENTS

| | | | |
|---|---|---|---|
| 2005/0075140 A1* | 4/2005 | Famolari | H04W 16/28 455/562.1 |
| 2006/0094456 A1* | 5/2006 | Rittle | H04W 48/16 455/519 |
| 2006/0198324 A1* | 9/2006 | Nerses | H04B 7/155 370/260 |
| 2007/0038346 A1* | 2/2007 | Ehrlich | G07C 5/008 701/31.4 |
| 2007/0223403 A1* | 9/2007 | Furuskar | H04W 52/24 370/278 |
| 2007/0223434 A1* | 9/2007 | Bennett | H04W 52/04 370/338 |
| 2007/0223439 A1* | 9/2007 | Kosai | H04W 72/0406 370/338 |
| 2007/0238417 A1* | 10/2007 | Bennett | H04W 52/24 455/69 |
| 2007/0242621 A1* | 10/2007 | Nandagopalan | H04L 12/413 370/254 |
| 2007/0280192 A1* | 12/2007 | Yagyu | H04L 12/4625 370/349 |
| 2008/0151842 A1* | 6/2008 | Tysowski | H04W 48/16 370/338 |
| 2008/0175265 A1* | 7/2008 | Yonge | H04B 3/54 370/447 |
| 2008/0316958 A1* | 12/2008 | Casone | H04W 74/0833 370/329 |
| 2008/0316997 A1* | 12/2008 | Zeng | H04L 29/12952 370/351 |
| 2009/0010216 A1* | 1/2009 | Li | H04W 40/02 370/329 |
| 2009/0196173 A1* | 8/2009 | Wang | H04W 72/0486 370/230 |
| 2009/0296602 A1* | 12/2009 | Bange | H04W 84/20 370/254 |
| 2009/0323608 A1* | 12/2009 | Adachi | H04W 48/18 370/329 |
| 2010/0189005 A1* | 7/2010 | Bertani | H04W 74/02 370/252 |
| 2010/0278161 A1* | 11/2010 | Ore | H04W 36/0083 370/338 |
| 2011/0009135 A1* | 1/2011 | Roskowski | H04W 36/0083 455/500 |
| 2011/0019582 A1* | 1/2011 | Okmyanskiy | H04L 41/0893 370/254 |
| 2011/0205961 A1* | 8/2011 | Santivanez | H04W 74/0816 370/328 |
| 2011/0292898 A1* | 12/2011 | Wu | H04W 72/082 370/329 |
| 2012/0002567 A1* | 1/2012 | Sun | H04W 28/16 370/252 |
| 2012/0224481 A1* | 9/2012 | Babiarz | H04L 43/0876 370/230.1 |
| 2012/0224483 A1* | 9/2012 | Babiarz | H04L 43/0847 370/232 |
| 2012/0224484 A1* | 9/2012 | Babiarz | H04L 41/5019 370/235 |
| 2013/0130695 A1* | 5/2013 | Ryu | H04W 36/0083 455/438 |
| 2013/0223425 A1* | 8/2013 | Kim | H04W 48/20 370/338 |
| 2014/0092723 A1* | 4/2014 | Murphy | H04L 41/00 370/221 |
| 2014/0241175 A1* | 8/2014 | Schell | H04W 4/06 370/252 |

* cited by examiner

MANAGING ACCESS TO TRANSMISSION MEDIUM IN A WIRELESS ENVIRONMENT

BACKGROUND

Field

The following description relates generally to telecommunication systems, and more particularly to managing access to a transmission medium in a wireless environment.

Background

The deployment of wireless local area networks (WLANs) in the home, the office, and various public facilities has experienced tremendous growth over the past several years. Typically, a WLAN is implemented with a wireless access point (AP) that connects a number of wireless stations (STAs) in a specific locality (e.g., home, office, or public facility) to a wide area network (WAN), such as the Internet or the like. In larger deployments, the locality may be divided into a number of cells with each cell having its own wireless AP. Each wireless AP is configured to connect the STAs in its cell to the wired network. Alternatively, the WLAN may be implemented as a mesh network where STAs operate in an ad-hoc mode to provide multi-hop routing for traffic though the WLAN.

STAs that operate in an IEEE 802.11 compliant WLAN use carrier sensing to access the transmission medium. Carrier sensing is a media access control (MAC) protocol in which a STA verifies the absence of traffic in the shared medium before transmitting. One type of carrier sensing supported by IEEE 802 is physical carrier sensing which samples the energy level in the medium and transmits only if the energy level is below a carrier sensing threshold. Another type of carrier sensing supported by IEEE 802.11 is virtual carrier sensing which uses a handshake protocol between the transmitting and receiving STAs to effectively reserve the medium. Virtual carrier sensing is often used to avoid the hidden node problem that is often encountered in mesh networks and large deployments with unknown topologies. However, in deployments with a single AP serving a smaller locality (or a cell within a locality), interference between STAs can often be mitigated through channel assignments and scheduling. In these deployments, physical carrier sensing may be used to avoid the additional overhead requirements of virtual carrier sensing.

Although physical carrier sensing may be adequate to mitigate interference within a cell or locality, interference between two APs operating in nearby localities or in neighboring cells can be problematic. Generally, the APs communicate with one another to optimize transmission power to avoid interference. However, a power imbalance can still occur where a first AP transmits at a higher power level than a second other AP. In that case, it possible that high power transmissions by the first AP may be detected by the second AP, but the lower power transmissions by second AP may not be detected the first AP. As a result, the first AP will transmit even though the second AP is transmitting simultaneously because it cannot detect the lower power transmissions by the second AP. However, the second AP will back off from transmitting when the first AP is transmitting. This creates an unfairness which provides the first AP with effectively exclusive access to the transmission medium.

Conventional WLANs have addressed this issue by increasing the carrier sensing threshold of the second AP to a level where it can no longer detect the transmissions by the first AP. This approach, however, tends to cause packet collisions at the STAs served by the second AP. Accordingly, there is a need in the art for managing access to the medium between APs using a carrier sensing protocol.

SUMMARY

According to an aspect of the disclosure, an apparatus for wireless communication includes a processing system. The processing system is configured to detect a condition experienced by only one of first and second wireless nodes, and modify an operational parameter of one of the first and second wireless nodes based on a first list of wireless nodes detected by the first wireless node and a second list of wireless nodes detected by the second wireless node, if the condition is detected, such that both the first and second wireless nodes experience the condition or neither the first and second wireless nodes experience the condition.

According to another aspect of the disclosure, an apparatus for wireless communication includes detecting means for detecting a condition experienced by only one of first and second wireless nodes, and modifying means for modifying an operational parameter of one of the first and second wireless nodes based on a first list of wireless nodes detected by the first wireless node and a second list of wireless nodes detected by the second wireless node, if the condition is detected, such that both the first and second wireless nodes experience the condition or neither the first and second wireless nodes experience the condition.

In a further aspect of the disclosure, a method of wireless communication includes detecting a condition experienced by only one of first and second wireless nodes, and modifying an operational parameter of one of the first and second wireless nodes based on a first list of wireless nodes detected by the first wireless node and a second list of wireless nodes detected by the second wireless node such that both the first and second wireless nodes experience the condition or neither the first and second wireless nodes experience the condition.

In yet another aspect of the disclosure, a computer-program product for managing access to a transmission medium includes a machine-readable medium comprising instructions executable by an apparatus to detect a condition experienced by only one of first and second wireless nodes, and modify an operational parameter of one of the first and second wireless nodes based on a first list of wireless nodes detected by the first wireless node and a second list of wireless nodes detected by the second wireless node, if the condition is detected, such that both the first and second wireless nodes experience the condition or neither the first and second wireless nodes experience the condition.

In a further aspect of the disclosure, an apparatus for wireless communication that is separate from a first wireless node includes a processing system configured to detect a condition experienced by only one of the first and a second wireless nodes, and modify an operational parameter of the first wireless node, if the condition is detected, such that both the first and second wireless nodes experience the condition or neither the first and second wireless nodes experience the condition.

In yet a further aspect of the disclosure, an apparatus for wireless communication that is separate from a first wireless node includes detecting means for detecting a condition experienced by only one of first and second wireless nodes, and modifying means for modifying an operational parameter of first wireless node, if the condition is detected, such that both the first and second wireless nodes experience the condition or neither the first and second wireless nodes experience the condition.

In another aspect of the disclosure, a method of wireless communication from an apparatus that is separate from a first wireless node includes detecting a condition experienced by only one of first and second wireless nodes, and modifying an operational parameter of the first wireless node such that both the first and second wireless nodes experience the condition or neither the first and second wireless nodes experience the condition.

In yet another aspect of the disclosure, a computer-program product for wireless communication from an apparatus that is separate from a first wireless node includes a machine-readable medium comprising instructions executable by a processing system to detect a condition experienced by only one of first and second wireless nodes, and modify an operational parameter of the first wireless node, if the condition is detected, such that both the first and second wireless nodes experience the condition or neither the first and second wireless nodes experience the condition.

In a further aspect of the disclosure, an access point includes at least one antenna configured to support communication with a second access point. The access point further includes a processing system configured to detect a condition experienced by only one of the access point and the second access point, and modify an operational parameter of one of the access point and the second access point based on a first list of access points detected by the access point and a second list of access points detected by the second access point, if the condition is detected, such that both the access point and second access point experience the condition or neither the access point and the second access point experience the condition.

In yet a further aspect of the disclosure, an access point separate from a second access point includes at least one antenna configured to support communication with a second access point. The access point further includes a processing system configured to detect a condition experienced by only one of the access point and the second access point, and modify an operational parameter of the second access point, if the condition is detected, such that both the access point and second access point experience the condition or neither the access point and the second access point experience the condition.

In another aspect of the disclosure, a station includes at least one antenna configured to support communication with a first access point and a second access point. The station further includes a processing system configured to detect a condition experienced by only one of the first and second access points, and modify an operational parameter of one of the first and second access points, if the condition is detected, such that both the first and second access points experience the condition or neither the first and second access points experience the condition.

It is understood that other aspects of apparatuses, methods, and articles of manufacture will become readily apparent to those skilled in the art from the following detailed description, wherein various aspects of apparatuses, methods and articles of manufacture are shown and described by way of illustration. As will be realized, these aspects may be implemented in other and different forms and its several details are capable of modification in various other respects. Accordingly, the drawings and detailed description are to be regarded as illustrative in nature and not as restrictive.

DETAILED DESCRIPTION

Various aspects of the disclosure will be described more fully hereinafter with reference to the accompanying drawings. This disclosure may, however, be embodied in many different forms by those skilled in the art and should not be construed as limited to any specific structure or function presented herein. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of this disclosure, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of this disclosure. It should be understood that any aspect of the disclosure disclosed herein may be embodied by one or more elements of a claim.

Although particular aspects will be described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description. The detailed description and drawings are merely illustrative of the disclosure rather than limiting, the scope of the disclosure being defined by the appended claims and equivalents thereof.

Figure 1:
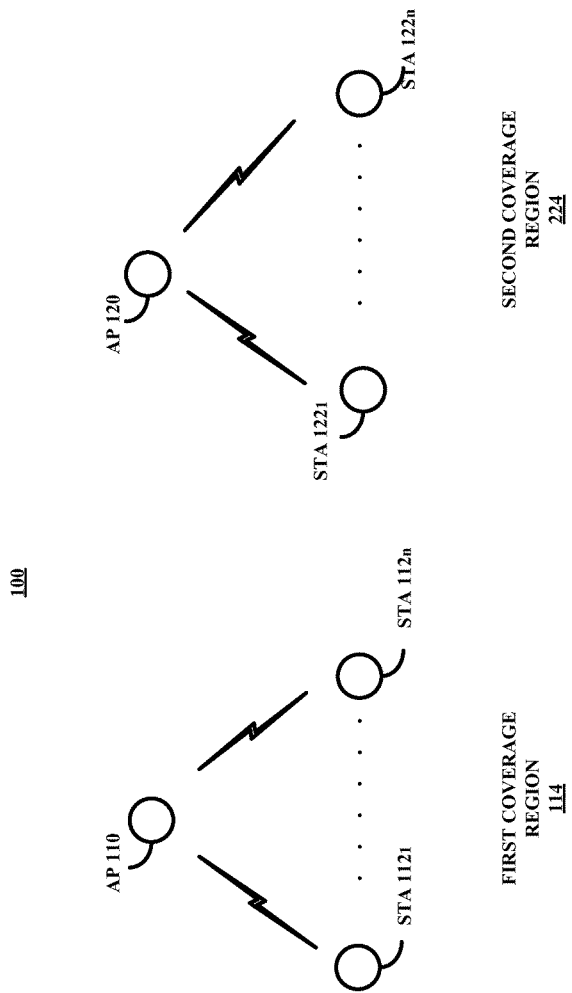
FIG. 1 is a conceptual diagram illustrating an example of a wireless environment with two access points.

FIG. 1 is a conceptual diagram illustrating an example of a wireless environment. The wireless environment 100 may include one or more wireless networks. In the detailed description that follows, each wireless network will be described as a WLAN, such as, for example, an IEEE 802.11 network. However, as those skilled in the art will readily appreciate, the various aspects described throughout this disclosure may be extended to wireless environments that include one or more wireless personal area networks (PANs), such as, for example, Bluetooth or UWB, or wireless WANs, such as by way of example, IS-2000, IS-95, IS-856, Wideband-CDMA, EV-DO, LTE, IEEE 802.16 (Wi-Max), and the like. The various aspects presented throughout this disclosure may be applicable to any combination of wireless networks regardless of the coverage range and the wireless access protocols utilized.

The wireless environment may support any number of apparatuses. An apparatus may be any suitable wireless node capable of operating in a wireless environment, such an access point (AP) or a station (STA). An AP is generally a fixed terminal that provides backhaul services to STAs in its coverage region, however, the AP point may be mobile in some applications. A STA, which may be fixed or mobile, utilizes the backhaul services of an AP to connect to a WAN, such as the Internet. Examples of a STA include, but are not limited to, a radio, a cellular phone, a smart phone, a session initiation protocol (SIP) phone, a laptop, a personal digital assistant (PDA), a personal communication system (PCS) device, a personal information manager (PIM), personal navigation device (PND), a global positioning system, a multimedia device, a video device, an audio device, an employee badge, an equipment asset tag, a wireless sensor, any combination thereof, or any other suitable wireless node requiring the backhaul services of an AP. A STA may also be referred to by those skilled in the art as a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, user equipment (UE), or some other suitable terminology. An AP may also be referred to as a base station, a base transceiver station, a radio base station, a radio transceiver, a transceiver function, a basic service set (BSS), an extended service set (ESS), an eNode-B, or any other suitable terminology. The various concepts described throughout this disclosure are intended to apply to all suitable wireless nodes regardless of their specific nomenclature.

Various concepts will now be presented for accessing a transmission medium by two or more APs. However, as those skilled in the art will readily appreciate, these concepts may be extended to other types of wireless nodes contending for access to a transmission medium. Returning to FIG. 1, two APs 110 and 120 are shown operating in separate wireless networks which are in close proximity to one another, or alternatively, in neighboring cells of the same wireless network. Either way, each AP 110 and 120 provides backhaul services to the STA's within its coverage region. In this aspect, the first AP 110 is shown providing backhaul services to a number of STAs $112_1$-$112_n$ in a first coverage region 114 and the second AP 120 is shown providing backhaul services to a number of STAs $122_1$-$122_n$ in a second coverage region 224.

Each AP provides backhaul services to STAs over a transmission medium. The AP gains access to the transmission medium using a physical carrier sensing protocol. As explained in the background portion of this disclosure, physical carrier sensing allows each AP to assess the medium before transmitting to avoid interference which may lead to packet collisions. Each AP samples the energy level (e.g., RSSI) at its air interface and transmits only if the sensed energy level is below the carrier sense threshold. By way of example, the first AP 110 may begin transmitting to a STA 112 within its coverage region after determining that the energy level at its air interface is below the carrier sense threshold. The second AP 120 may then sample the energy level at its air interface before transmitting to a STA 122 in its coverage region. However, the sensed energy level at the second AP 120 will likely be above the carrier sense threshold because of the transmission by the first AP 110. As a result, the second AP 120 will back off to prevent interference that may cause packet collisions.

Figure 2:
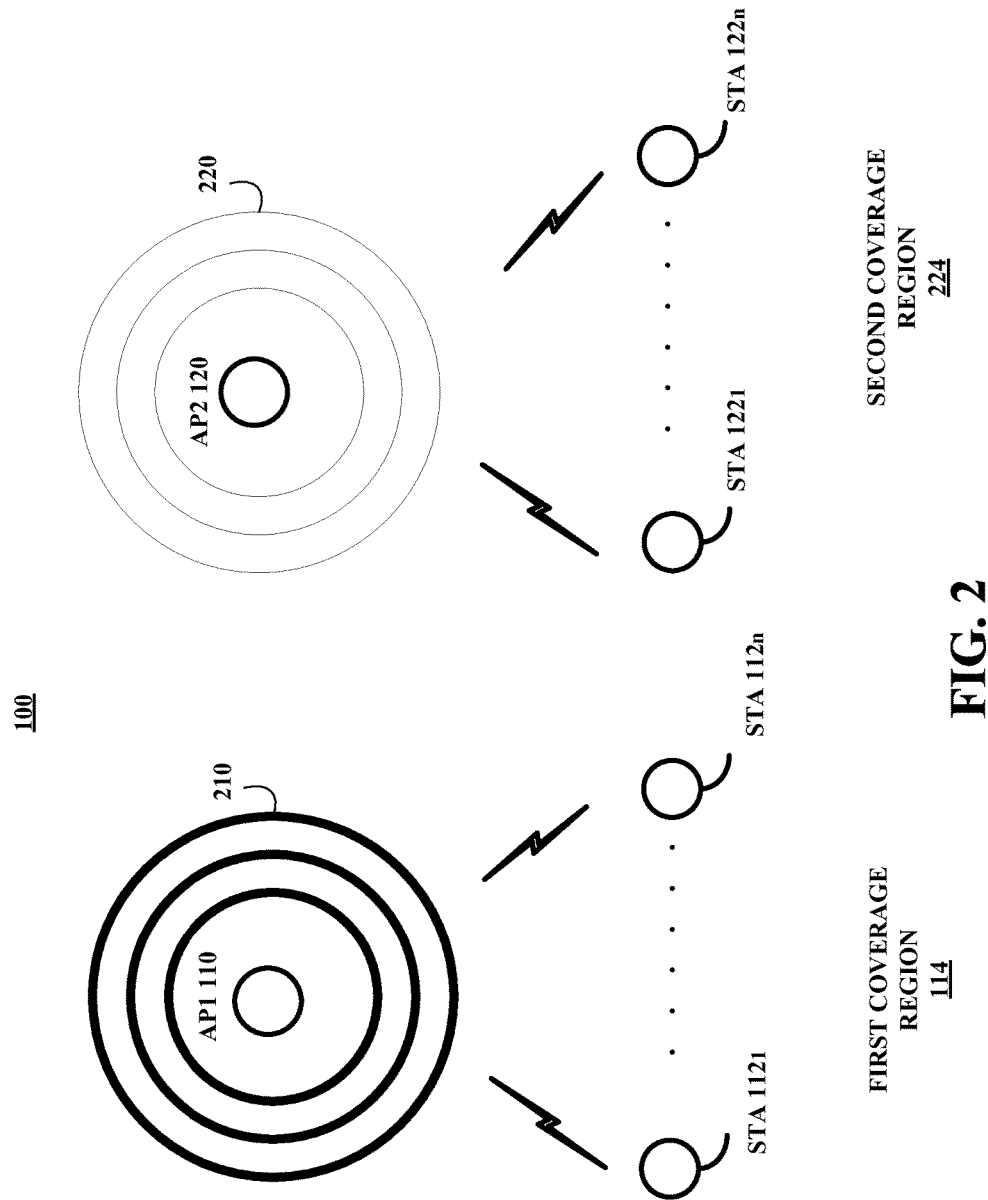
FIG. 2 is a conceptual diagram illustrating an example of a wireless environment with two access points operating at different power levels.

The two APs 110 and 120 communicate with one another using a standard protocol, either over the air or through the backhaul, to optimize transmission power. However, a power imbalance can still occur between the two depending upon the power requirements of the coverage region each serves. By way of example, the first AP 110 may need to increase its transmission power to support quality of service (QoS) requirements in an unfavorable wireless environment while the second AP 120 may be able to reduce its transmission power to meet the QoS requirement under more favorable wireless conditions. This condition is illustrated in FIG. 2 where the power output of each AP 110 and 120 is represented by the thickness of the propagating waves 210 and 220, respectively. This could create an unfair situation which provides the first AP 110 with effectively exclusive access to the transmission medium. The energy level sensed by first AP 110 may be below the carrier sense threshold when the second AP 120 is engaging in low power transmission. As a result, the first AP 110 will transmit even though the second AP 120 is transmitting simultaneously. Conversely, the second AP 120 will always back off when the first AP 110 is transmitting because the transmissions by the first AP 110 raises the energy at the second AP 120 to a level that exceeds the carrier sense threshold.

Figure 3:
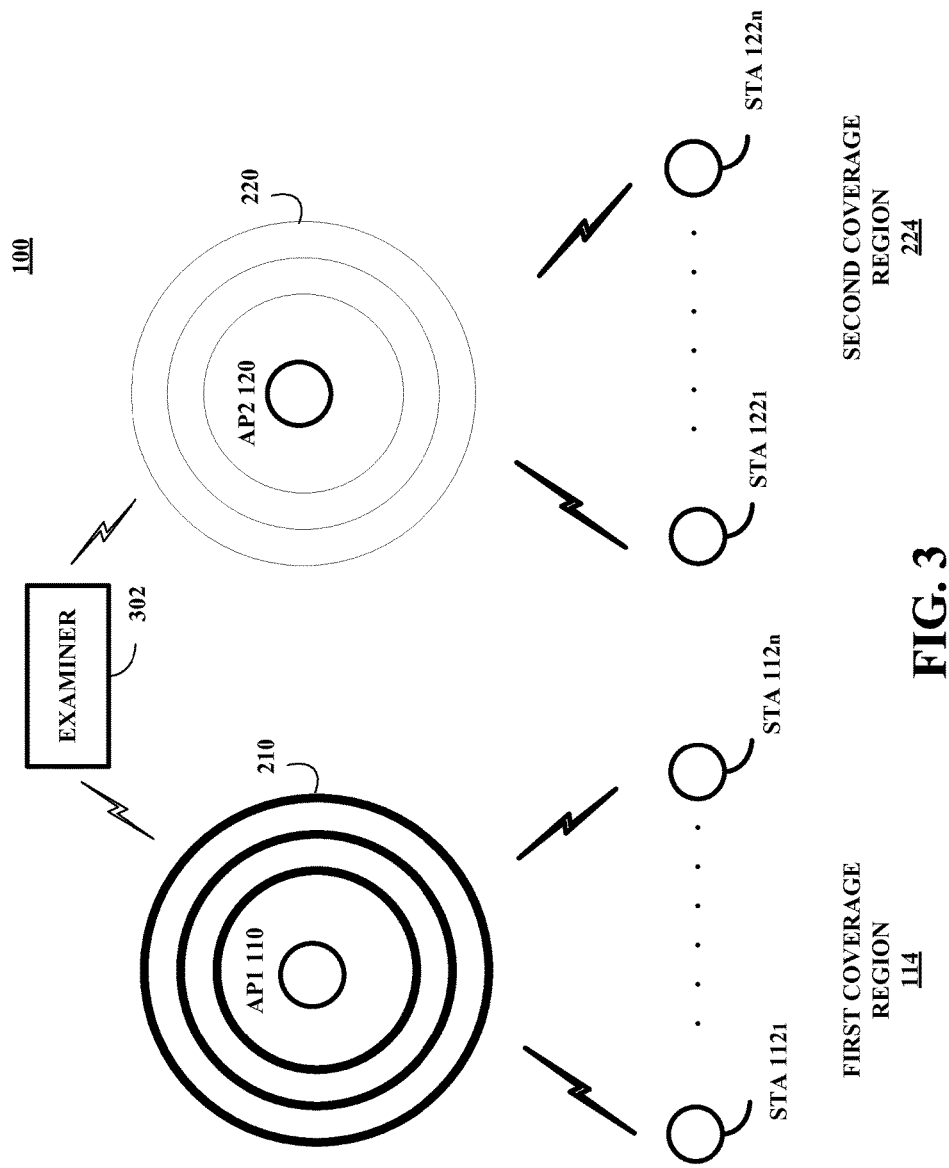
FIG. 3 is a conceptual diagram illustrating an example of a wireless environment with an examiner in communication with two access points.

Various concepts and techniques will now be presented for resolving this condition. An entity, which will be referred to as an "examiner" for the purposes of this disclosure, may be used manage the transmissions of both APs 110 and 120 under this condition. FIG. 3 is a conceptual diagram illustrating an example of a wireless environment with an examiner 302 in communication with the APs 110 and 120. The examiner is shown as a separate apparatus, but may be embodied in different forms. By way of example, the examiner 302 may be integrated into an AP, STA, or other wireless node. Alternatively, the examiner 302 may be integrated into a network related entity (not shown), such as a server, gateway, mainframe, or any other suitable entity that performs network related functions. In at least one aspect, the examiner 302 may be a distributed entity. By way of example, the examiner 302 may be distributed across multiple dedicated entities, multiple network-related entities, multiple APs, multiple STAs, or any combination thereof. The particular design and locality of the examiner 302 will vary depend on any number of factors including the particular application and the overall design constraints imposed on the wireless environment.

Figure 4:
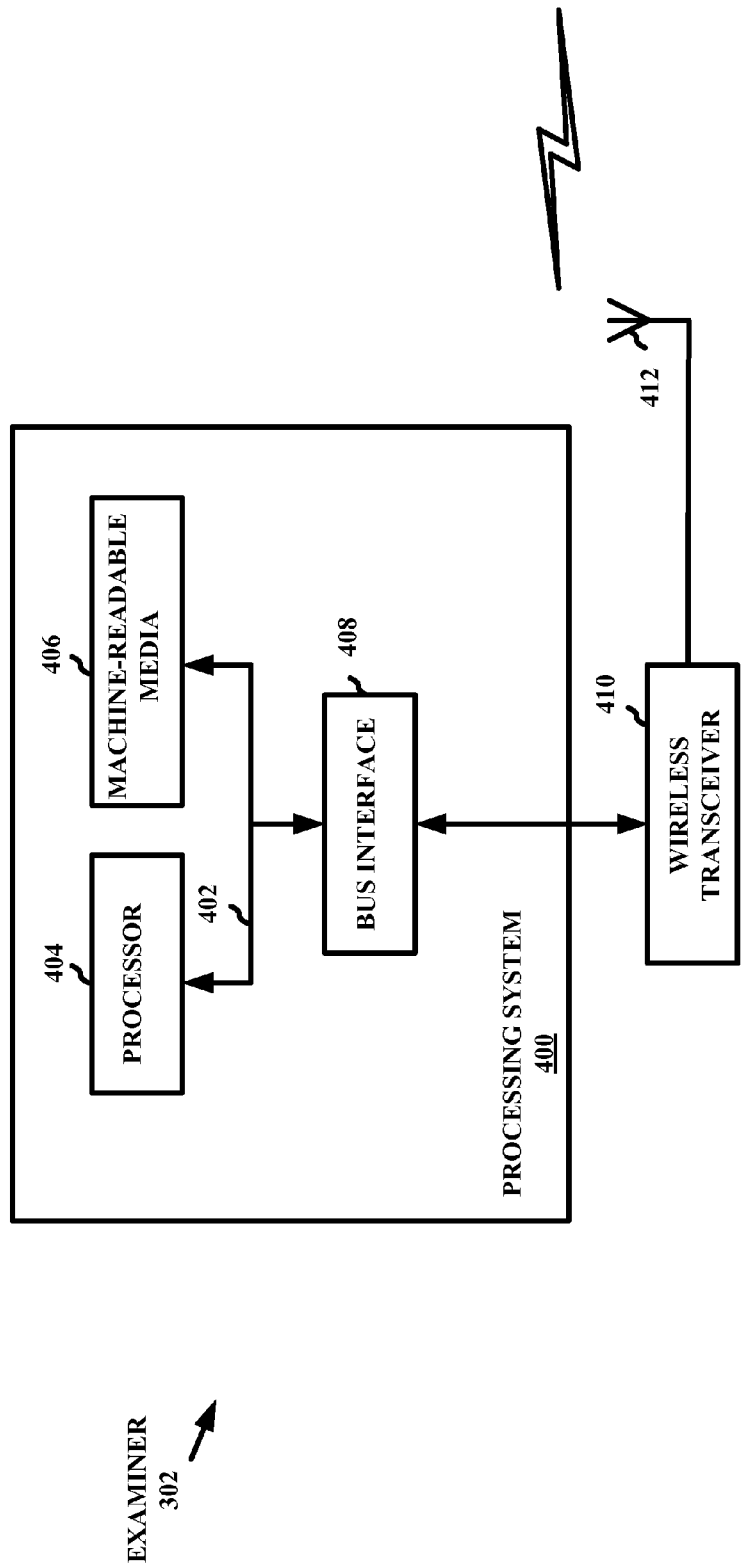
FIG. 4 is an architectural diagram illustrating an example of an examiner.

FIG. 4 is an architectural diagram illustrating an example of an examiner. The examiner may include a detecting means for detecting a condition experienced by only one of first and second APs, and a modifying means for modifying an operational parameter of one of the first and second APs, if the condition is detected, such that both the first and second APs experience the condition or neither the first and second APs experience the condition. The modifying means may include various means for increasing transmission and/or decreasing transmission power of one of the APs, increasing and/or decreasing the carrier sensing threshold of one of the APs, causing one of the APs to use a virtual carrier sensing protocol, and/or causing one of the APs to change its channel assignment. The detecting means, the modifying means, and the various other means described above may comprise a processing system 400. The processing system 400 may be implemented with a bus architecture represented generally by bus 402. The bus 402 may include any number of interconnecting buses and bridges depending on the specific application of the processing system 400 and the overall design constraints. The bus links together various circuits including a processor 404, machine-readable media 406, and a bus interface 408. The bus interface 408 may be used to connect a wireless transceiver 410, among other things, to the processor 404 via the bus 402. The wireless transceiver 410 may be used to wirelessly communicate with the APs through an antenna 412 using any suitable wireless protocol, such as, by way of example, IEEE 802.11. The bus 402 may also link various other circuits such as timing sources, peripherals, voltage regulators, power management circuits, and the like, which are well known in the art, and therefore, will not be described any further.

The processor 404 is responsible for managing the bus and general processing, including the execution of software stored on the machine-readable media 406. The processor 404 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof.

In the architectural illustration presented in FIG. 4, the machine-readable media 406 is shown as part of the processing system 400 separate from the processor 404. However, as those skilled in the art will readily appreciate, the machine-readable media 406, or any portion thereof, may be external to the processing system 400 or even external to the examiner 302. Alternatively, or in addition to, the machine readable media 404, or any portion thereof, may be integrated into the processor 404, such as the case may be with cache and/or general register files.

The processing system 400 may be configured as a general-purpose processing system with one or more microprocessors providing the processor functionality and external memory providing at least a portion of the machine-readable media 406, all linked together with other supporting circuitry through a bus. Alternatively, the processing system 400 may be implemented with an ASIC (Application Specific Integrated Circuit) with the processor 404, the bus interface 408, supporting circuitry (not shown), and at least a portion of the machine-readable media 406 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 400 depending on the particular application and the overall design constraints imposed on the overall system.

The machine-readable media 406 may be used to store software. The software includes instructions that when executed by the processor 404 cause the processing system 400 to perform various functions. The software may reside in a single storage device or distributed across multiple storage devices. By way of example, software may be loaded into RAM from a hard drive when a triggering event occurs. During execution of the software, the processor 404 may load some of the instructions into cache to increase access speed. One or more cache lines may then be loaded into a general register file for execution by the processor 404. When referring to the functionality of software, it will be understood that such functionality is implemented by the processor 404 when executing software instructions.

Figure 5:
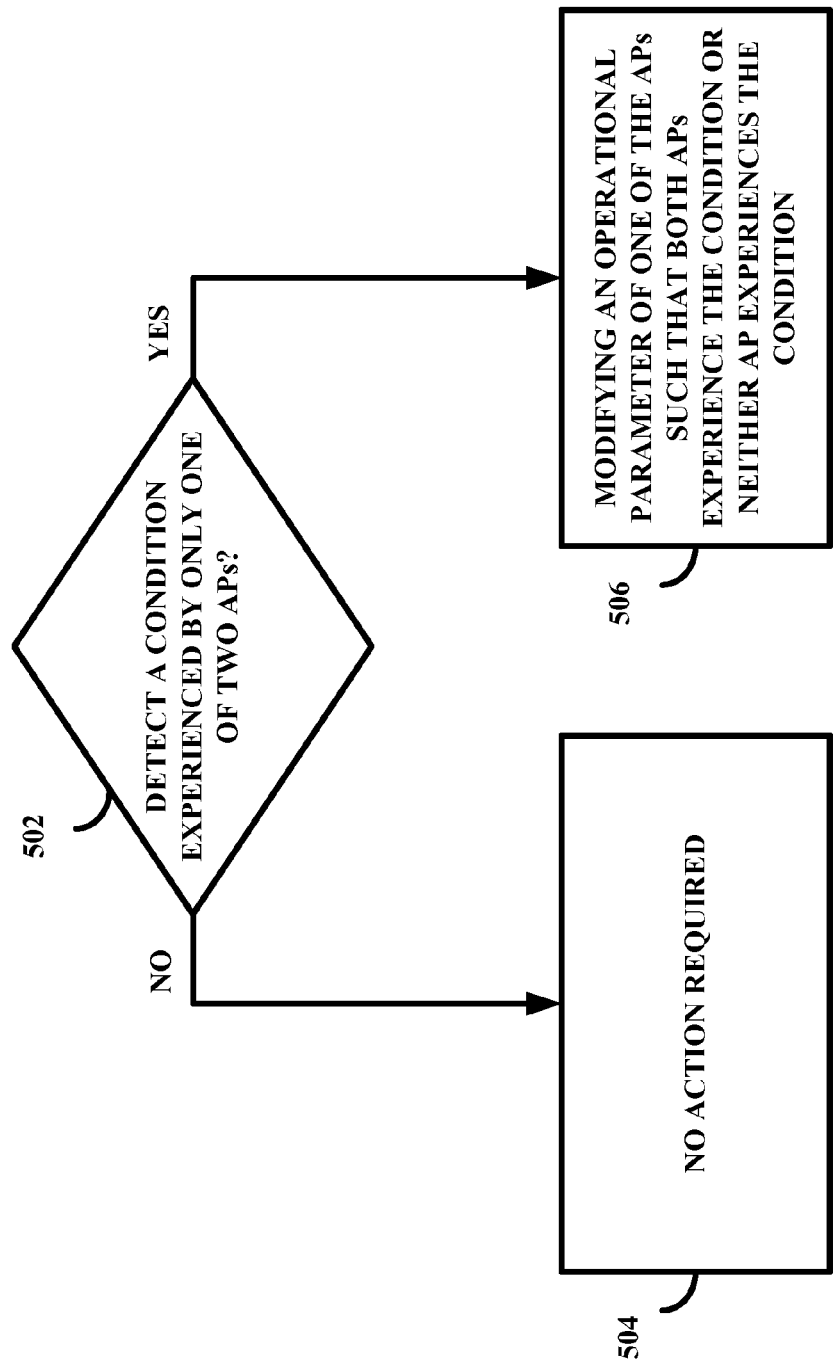
FIG. 5 is a flow diagram illustrating an example of the functionality of an examiner.

FIG. 5 is a flow diagram illustrating an example of the functionality of an examiner. In block 502, the examiner detects whether a condition is experienced by only one of two APs. If the condition is not detected, then no action is required in block 504. However, if the examiner detects the condition, then in block 506, an operational parameter for one of the APs is modified such that both APs experience the condition or neither AP experiences the condition.

Figure 6:
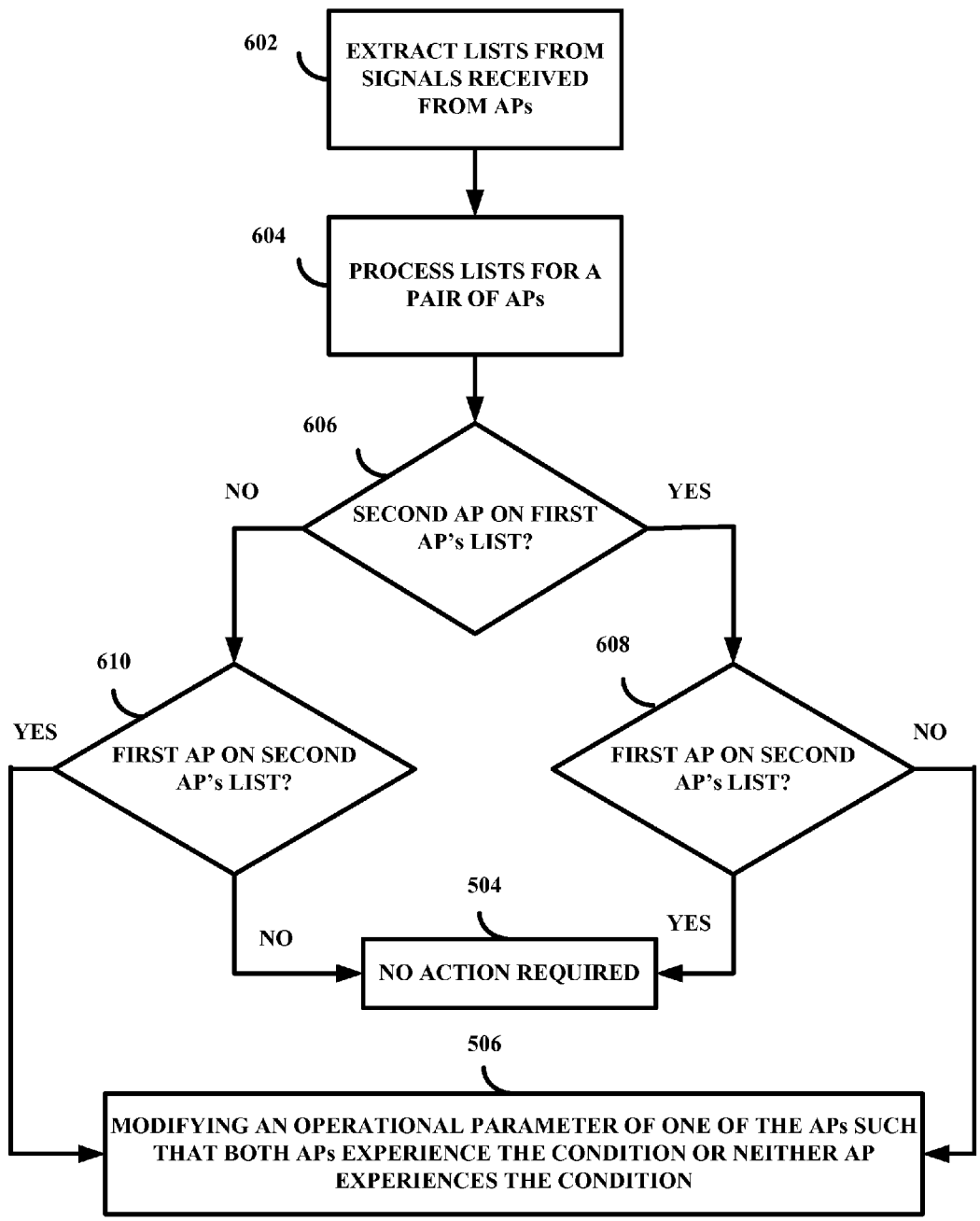
FIG. 6 is a flow diagrams expanding on the process presented in FIG. 5.
Figure 7:
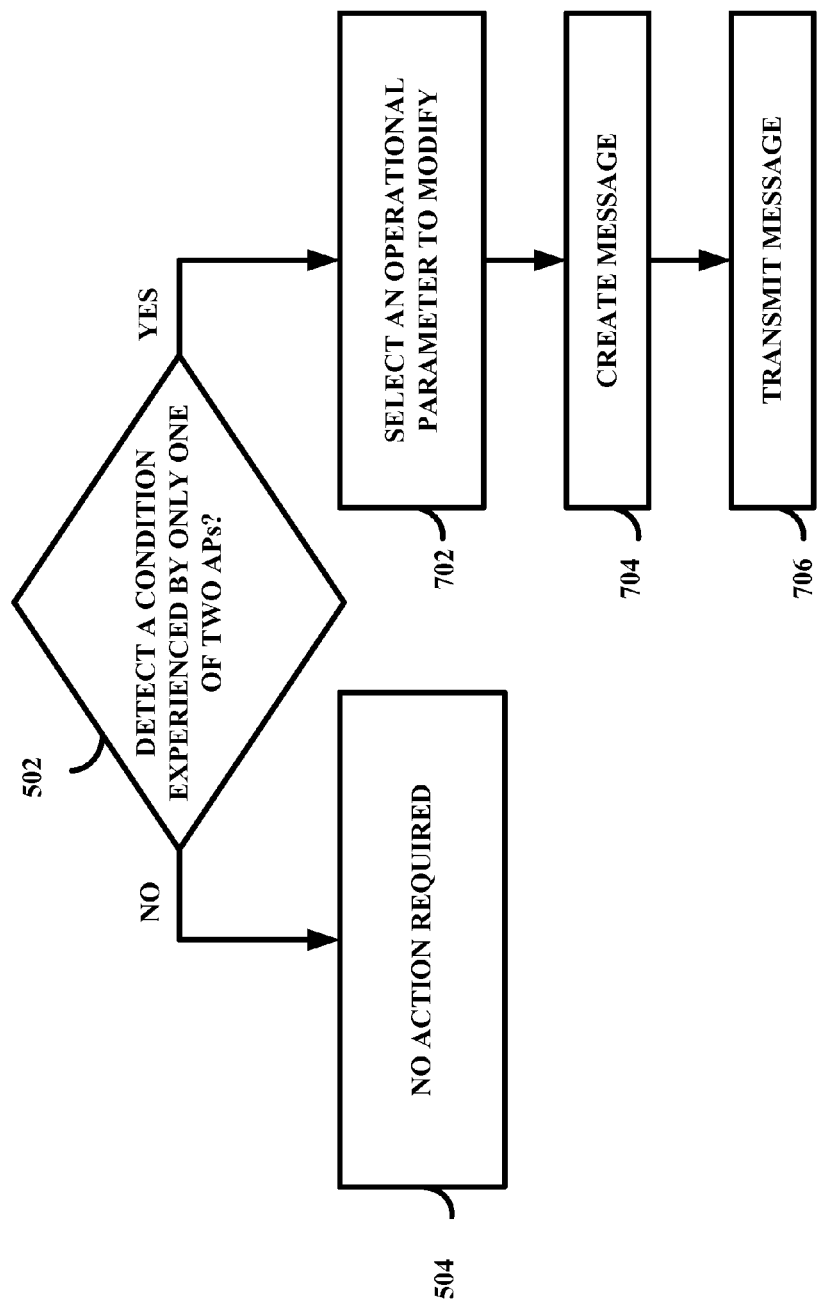
FIG. 7 is a flow diagram further expanding on the process presented in FIG. 5.

In at least one aspect, the condition that is detected by the examiner system is the inability of a first AP to detect the transmissions from a second AP, even though the second AP can detect the transmissions from the first AP. By way of example, a power imbalance between the two APs may result in the first AP being unable to detect the lower power transmissions of the second AP, while the second AP detects the higher transmissions of the first AP. As explained earlier, this condition may provide the first AP with effectively exclusive access to the transmission medium. This aspect will be described in further detail in connection with FIGS. 6-7. FIG. 6 is a flow diagrams expanding on the process of detecting the condition presented in block 502 of FIG. 5. FIG. 7 is a flow chart expanding on the process of modifying an operational parameter presented in block 506 of FIG. 5.

The condition may be detected by the examiner from lists compiled by each AP. Specifically, the first AP may compile a list of APs it detects and the second AP may compile a list of APs it detects. The lists may be transmitted to the examiner by any suitable means. By way of example, each AP may transmit its list in its beacon signal. Alternatively, a messaging protocol between the examiner and the APs may be used to transmit the lists. In the latter example, each AP may transmit its list to the examiner in response to a request from the examiner. The request may be a broadcast by the examiner to all APs in the wireless environment, or may be addressed to each AP individually. Those skilled in the art will be best suited to determine the appropriate methodology for transmitting the list from each AP to the examiner for any particular application.

The examiner includes a means for extracting the first and second lists from a signal received from the APs. The means for extracting the first and second lists may comprise the processing system 400 (see FIG. 4). Turning to FIG. 6, the examiner extracts the lists from the signals received from various APs in block 602. Next, in block 604, the examiner processes the lists for a pair of APs. The pair of APs will be referred to as first and second APs. In block 606, the examiner determines whether the second AP is on the first AP's list. If it is, than the first AP is able to detect the transmissions of the second AP and the process continues to block 608. If, on the other hand, the second AP is not on the first AP's list, than the first AP cannot detect the transmissions of the second AP. In that event, the process continues to block 610.

In block 608, the examiner determines whether the first AP is on the second AP's list. If it is, than the second AP can detect the transmissions of the first AP, and therefore, no action is required in block 504. If, on the other hand, the first AP is not on the second AP's list, than the second AP cannot detect the transmissions of the first AP. In that event, an operational parameter for one of the APs is modified in block 506.

Similarly, in block 610, the examiner determines whether the first AP is on the second AP's list. If the first AP is not on the second AP's list, than the second AP cannot detect the transmissions of the first AP. In that case, no action is required in block 504. If, on the other hand, the first AP is on the second AP's list, than the second AP can detect the transmissions of the first AP. In that event, an operational parameter for one of the APs in modified in block 506.

The process presented in FIG. 6 will now be applied to the examples discussed earlier in connection with FIGS. 1-3. In this example, the first AP 110 would compile a list containing no other APs because it is unable to detect the second AP 120. The second AP 120 would compile a list containing the first AP 110 because it is able to detect the first AP 110. These lists would be transmitted in the beacon or other signal from their respective APs 110 and 120 to the examiner. In block 602, the examiner would extract these lists from the signals and process them in block 604. In block 606, the examiner would determine that the second AP 120 is not on the list from the first AP 110 and proceed to block 610. In block 610, the examiner would determine that the first AP 110 is on the list from the second AP 120. As a result, the examiner would modify an operational parameter for one of the APs in block 506.

Turning to FIG. 7, the examiner detects whether a condition is experienced by only one of two APs in block 502. In this example, the condition that is detected by the examiner is the inability of a first AP to detect the transmissions from a second AP, even though the second AP can detect the transmissions from the first AP. If the examiner detects this condition, the process continues to block 702.

In block 702, the examiner selects an operational parameter to modify to resolve this issue. The operational parameter may be modified such that each AP can detect the transmissions of the other AP. Alternatively, the operational parameter may be modified such that the neither AP can detect the transmissions of the other AP. Either way, the first AP will no longer enjoy the exclusivity of the transmission medium.

There are a number of operational parameters the examiner can modify such that the two APs can detect each other's transmissions. The examiner can increase the transmission power of the second AP or reduce the carrier sensing threshold of the first AP. Alternatively, the examiner can force the second AP to utilize a virtual carrier sensing protocol that uses the Request-to-Send/Clear-to-Send (RTS/CTS) handshake to effectively reserve the transmission medium before transmitting. Utilizing a virtual sensing protocol, the second AP broadcasts its intended transmission time in an RTS frame. The RTS frame is echoed by other APs operating at higher power or operating in closer proximity to the first AP. The first AP receives the CTS frame from these other APs and updates its NAV (Network Allocation Vector) to indicate the period during which the transmission medium is reserved by the second AP. The first AP will back off on transmissions until the time period in its NAV expires.

There are also a number of operational parameters the examiner can modify such that the two APs cannot detect each other's transmissions. The examiner can decrease the transmission power of the first AP or increase the carrier sensing threshold of the second AP. Alternatively, the examiner can change the channel assignment for one of the APs so that the APs are operating on different channels.

Once the examiner selects the operational parameter to modify, it creates a message in block 704. The message will identify the operational parameter and the modification to the operation parameter. By way of example, the message may have a field that identifies transmission power and another field that identifies whether the transmission power should be increased or decreased. The message may include a header with the address of the AP to receive the message or include any other suitable addressing or protocol scheme. The message, once created by the examiner, is then transmitted to the destination AP over the transmission medium in block 706.

Various aspects may be practiced where an examiner has one or more of the operational parameters adjustments above available to it. For aspects that have multiple operational parameter adjustments available, the examiner may select an operational parameter to adjust randomly, or intelligently based on one or more factors related to the wireless environment. By way of example, the examiner may decide to force an AP that is undetected by another AP to use a virtual carrier sensing protocol rather than increasing the transmission power of that AP when there is heavy traffic in the wireless environment and a greater potential for interference. Conversely, the examiner may decide to increase the transmission power of the AP when the wireless environment contains relatively few APs or traffic is light to avoid the additional overhead associated with a virtual carrier sensing protocol. In addition, the examiner may select from additional operational parameters adjustments that are not disclosed herein, but will be apparent to those skilled in the art from the teachings presented throughout this disclosure. The skilled artisan will be well suited to configure the examiner best for any particular application or wireless environment.

The various processes described above in connection with FIGS. 6-7 can be extended to wireless environments with more than two APs. The basic processing algorithm is fundamentally the same. That is, for any given AP pair, the examiner first determines whether a list from the first AP includes the second AP and vice versa. The difference is that the examiner runs this process for every pair combination of APs in the wireless environment and then determines whether or not to adjust an operational parameter for one or more APs.

Figure 8:
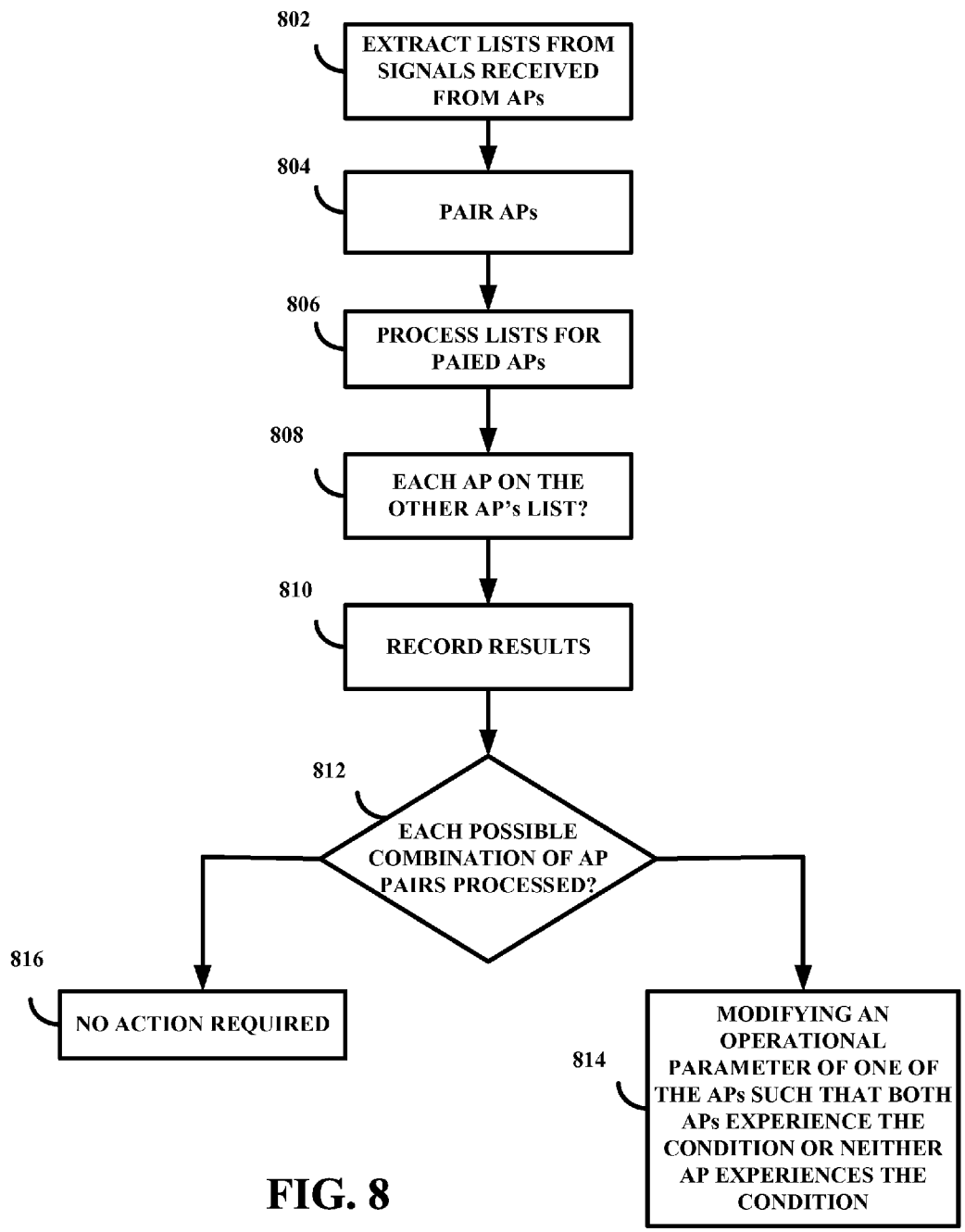
FIG. 8 is a flow diagram expanding on the process of FIG. 5 for a wireless environment with more than two access points.

FIG. 8 is a flow diagram expanding on the process of FIG. 5 for a wireless environment with more than two APs. In block 802, the examiner extracts the lists from the signals received from various APs. Next, the examiner pairs two of the APs in block 804 and processes the lists for that AP pair in block 806. Consistent with the examples presented earlier in this disclosure, the paired APs will be referred to as first and second APs. In block 808, the examiner determines whether each AP is on the other AP's list. The result is recorded in block 810. Next, the examiner determines in block 812 whether each possible combination of AP pairs has been processed. If the examiner determines that each possible combination of AP pairs has not been processed, it returns to block 804 to pair two APs which have not yet been processed. If, on the other hand, the examiner determines that all possible AP pairs have been processed, it uses the recorded information to determine whether or not to take action. As discussed earlier, the examiner may modify an operational parameter for one or more APs in block 814 or take no action in block 816.

Figure 9:
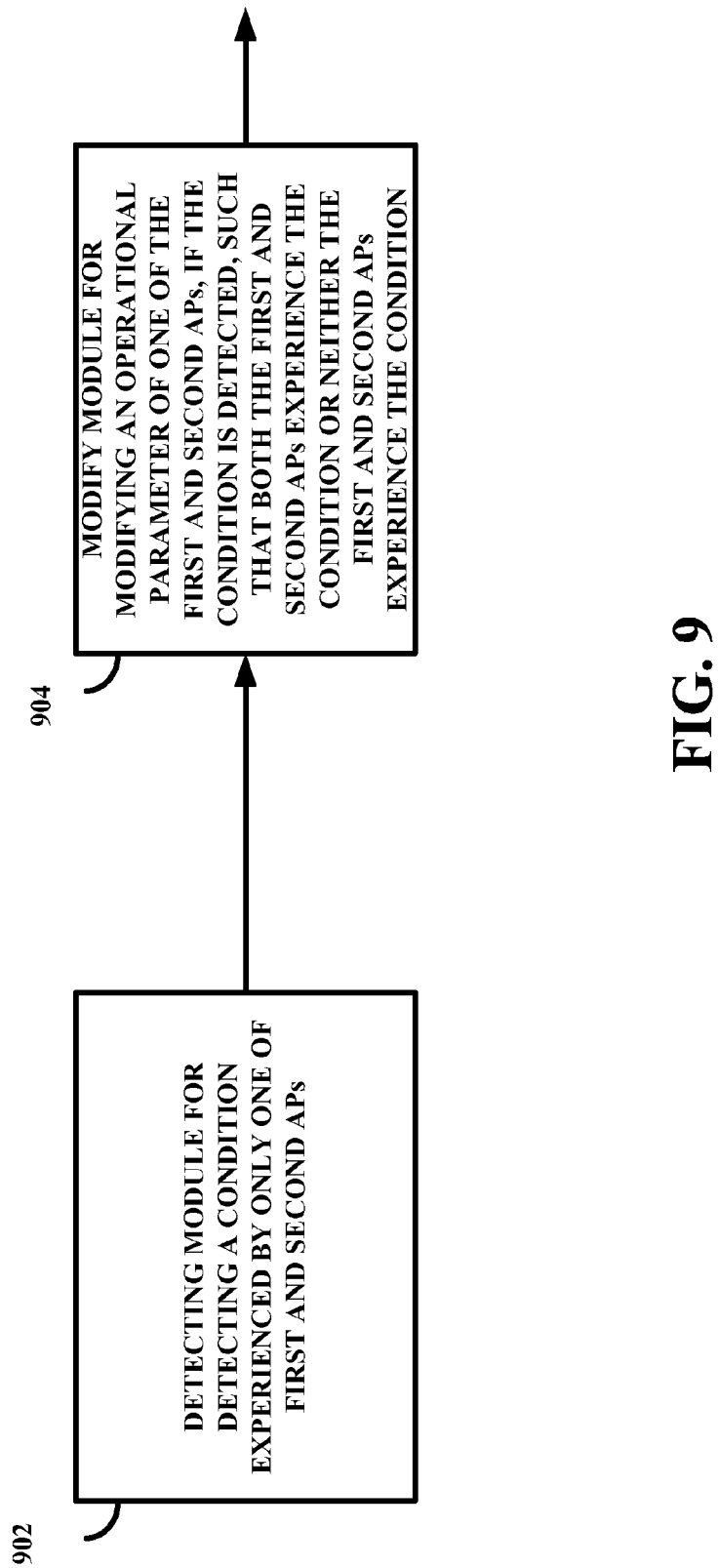
FIG. 9 is a functional block diagram illustrating an example of the functionality of an examiner.

FIG. 9 is a functional block diagram illustrating an example of the functionality of an examiner. The examiner includes a detecting module 902 for detecting a condition experienced by only one of first and second APs, and modifying module 904 for modifying an operational parameter of one of the first and second APs, if the condition is detected, such that both the first and second APs experience the condition or neither AP experiences the condition.

It is understood that the specific order or hierarchy of blocks in the processes disclosed is an illustration of exemplary approaches. Based upon design preferences, it is understood that the specific order or hierarchy of blocks in the processes may be rearranged. The accompanying method claims include various blocks for a process, but the recited blocks are not meant to be limited to any specific order or hierarchy unless expressly stated in the claims.

Although various aspects of the present invention have been described as software implementations, those skilled in the art will readily appreciate that the various software modules presented throughout this disclosure may be implemented in hardware, or any combination of software and hardware. Whether these aspects are implemented in hardware or software depends upon the particular application and design constraints imposed on the overall system. Skilled artisans may implement the described functionality in varying ways for each particular application, but such implementation decisions should not be interpreted as causing a departure from the scope of the invention.

The previous description is provided to enable any person skilled in the art to fully understand the full scope of the invention. Modifications to the various configurations disclosed herein will be readily apparent to those skilled in the art. Thus, the claims are not intended to be limited to the various aspects of the invention described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, and C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "block for."

What is claimed is:

1. An apparatus for wireless communication, comprising:
a processing system configured to:
determine a first list wherein the first list includes wireless nodes detected by a first wireless node;
receive a second list from a second wireless node, wherein the second list includes wireless nodes detected by the second wireless node;
detect a condition experienced by only one of the first and the second wireless nodes, wherein the condition is detected by determining that either (1) the first list includes the second wireless node and the second list does not include the first wireless node or (2) the second list includes the first wireless node and the first list does not include the second wireless node;
in response to the detected condition, select an operational parameter from a plurality of operational parameters that includes (1) virtual carrier sensing protocol and (2) transmission power, wherein the selection is based on wireless traffic at the first and the second wireless nodes; and
modify the selected operational parameter of the first or the second wireless node such that both the first and second wireless nodes experience the condition or neither the first nor the second wireless node experiences the condition, wherein the selected operational parameter is modified by (1) requiring use of the virtual carrier sensing protocol at the first wireless node or at the second wireless node if the virtual carrier sensing protocol is the selected operational parameter, or (2) requiring an adjustment of the transmission power at the first wireless node or at the second wireless node if the transmission power is the selected operational parameter.

2. The apparatus of claim 1, wherein the apparatus is separate from the first and second wireless nodes, and the processing system is configured to receive the first list from the first wireless node, and the determination of the first list is based on receiving the first list from the first wireless node.

3. The apparatus of claim 1, wherein the condition comprises an inability by said one of the first and second wireless nodes to detect a transmission from the other one of the first and second wireless nodes.

4. The apparatus of claim 3, wherein the selected operational parameter comprises transmission power, and wherein the processing system is further configured to modify the selected operational parameter by causing the other one of the first and second wireless nodes to increase its transmission power.

5. The apparatus of claim 3, wherein the selected operational parameter comprises transmission power, and wherein the processing system is further configured to modify the selected operational parameter by causing said one of the first and second wireless nodes to decrease its transmission power.

6. The apparatus of claim 3, wherein the selected operational parameter comprises a carrier sensing protocol, and wherein the processing system is further configured to modify the selected operational parameter by causing the other one of the first and second wireless nodes to use the virtual carrier sensing protocol.

7. The apparatus of claim 3, wherein the selected operational parameter comprises a carrier sensing threshold, and wherein the processing system is further configured to modify the selected operational parameter by causing the other one of the first and second wireless nodes to increase its carrier sensing threshold.

8. The apparatus of claim 3, wherein the selected operational parameter comprises a carrier sensing threshold, and wherein the processing system is further configured to modify the selected operational parameter by causing said one of the first and second wireless nodes to decrease its carrier sensing threshold.

9. The apparatus of claim 1, wherein the processing system is further configured to extract at least one of the first and second lists from a signal received by the apparatus.

10. An apparatus for wireless communication, comprising:

determining means for determining a first list wherein the first list includes wireless nodes detected by a first wireless node;

receiving means for receiving a second list from a second wireless node, wherein the second list includes wireless nodes detected by the second wireless node;

detecting means for detecting a condition experienced by only one of the first and the second wireless nodes, wherein the condition is detected by determining that either (1) the first list includes the second wireless node and the second list does not include the first wireless node or (2) the second list includes the first wireless node and the first list does not include the second wireless node; and modifying means for modifying a selected operational parameter of the first or the second wireless nodes such that both the first and second wireless nodes experience the condition or neither the first nor the second wireless node experiences the condition, wherein, in response to the detected condition, the selected operational parameter is selected from a plurality of operational parameters based on wireless traffic at the first and the second wireless nodes, wherein the plurality of operational parameters includes (1) virtual carrier sensing protocol and (2) transmission power, and wherein the modifying means is configured to modify the selected operational parameter by (1) requiring use of the virtual carrier sensing protocol at the first wireless node or at the second wireless node if the virtual carrier sensing protocol is the selected operational parameter, or (2) requiring an adjustment of the transmission power at the first wireless node or at the second wireless node if the transmission power is the selected operational parameter.

11. The apparatus of claim 10, wherein the apparatus is separate from the first and second wireless nodes, and the determining means is configured to receive the first list from the first wireless node, and the determination of the first list is based on receiving the first list from the first wireless node.

12. The apparatus of claim 10, wherein the condition comprises an inability by said one of the first and second wireless nodes to detect a transmission from the other one of the first and second wireless nodes.

13. The apparatus of claim 12, wherein the selected operational parameter comprises transmission power, and wherein the modifying means is configured to cause the other one of the first and second wireless nodes to increase its transmission power.

14. The apparatus of claim 12, wherein the selected operational parameter comprises transmission power, and wherein the modifying means is configured to cause said one of the first and second wireless nodes to decrease its transmission power.

15. The apparatus of claim 12, wherein the selected operational parameter comprises a carrier sensing protocol, and wherein the modifying means is configured to cause the other one of the first and second wireless nodes to use the virtual carrier sensing protocol.

16. The apparatus of claim 12, wherein the selected operational parameter comprises a carrier sensing threshold, and wherein the modifying means is configured to cause the other one of the first and second wireless nodes to increase its carrier sensing threshold.

17. The apparatus of claim 12, wherein the selected operational parameter comprises a carrier sensing threshold, and wherein the modifying means is configured to cause said one of the first and second wireless nodes to decrease its carrier sensing threshold.

18. The apparatus of claim 10, further comprising means for extracting at least one of the first and second lists from a signal received by the apparatus.

19. A method of wireless communication with an apparatus, comprising:

determining a first list, wherein the first list includes wireless nodes detected by a first wireless node;

receiving a second list from a second wireless node, wherein the second list includes wireless nodes detected by the second wireless node;

detecting a condition experienced by only one of the first and the second wireless nodes, wherein the condition is detected by determining that either (1) the first list includes the second wireless node and the second list does not include the first wireless node or (2) the second list includes the first wireless node and the first list does not include the second wireless node;

in response to the detected condition, selecting an operational parameter from a plurality of operational parameters that includes (1) virtual carrier sensing protocol and (2) transmission power, wherein the selection is based on wireless traffic at the first and the second wireless nodes; and modifying the selected operational parameter of the first and the second wireless nodes such that both the first and second wireless nodes experience the condition or neither the first nor the second wireless node experiences the condition, wherein the selected operational parameter is modified by (1) requiring use of the virtual carrier sensing protocol at the first wireless node or at the second wireless node if the virtual carrier sensing protocol is the selected operational parameter, or (2) requiring an adjustment of the transmission power at the first wireless node or at the second wireless node if the transmission power is the selected operational parameter.

20. The method of claim 19, wherein the apparatus is separate from the first and second wireless nodes, and the determining the first list comprises receiving the first list from the first wireless node.

21. The method of claim 19, wherein the condition comprises an inability by said one of the first and second wireless nodes to detect a transmission from the other one of the first and second wireless nodes.

22. The method of claim 21, wherein the selected operational parameter comprises transmission power, and wherein the modifying of the selected operational parameter comprises causing the other one of the first and second wireless nodes to increase its transmission power.

23. The method of claim 21, wherein the selected operational parameter comprises transmission power, and wherein the modifying of the selected operational parameter comprises causing said one of the first and second wireless nodes to decrease its transmission power.

24. The method of claim 21, wherein the selected operational parameter comprises a carrier sensing protocol, and wherein the modifying of the selected operational parameter comprises causing the other one of the first and second wireless nodes to use the virtual carrier sensing protocol.

25. The method of claim 21, wherein the selected operational parameter comprises a carrier sensing threshold, and wherein the modifying of the selected operational parameter comprises causing the other one of the first and second wireless nodes to increase its carrier sensing threshold.

26. The method of claim 21, wherein the selected operational parameter comprises a carrier sensing threshold, and wherein the modifying of the selected operational parameter comprises causing said one of the first and second wireless nodes to decrease its carrier sensing threshold.

27. The method of claim 19, further comprising extracting at least one of the first and second lists from a signal received by the apparatus.

28. A non-transitory computer-readable medium storing computer executable code for wireless communication by an apparatus, comprising code for:
determining a first list wherein the first list includes wireless nodes detected by a first wireless node;
receiving a second list from a second wireless node, wherein the second list includes wireless nodes detected by the second wireless node;
detecting a condition experienced by only one of the first and the second wireless nodes, wherein the condition is detected by determining that either (1) the first list includes the second wireless node and the second list does not include the first wireless node or (2) the second list includes the first wireless node and the first list does not include the second wireless node;
in response to the detected condition, selecting an operational parameter from a plurality of operational parameters that includes (1) virtual carrier sensing protocol and (2) transmission power, wherein the selection is based on wireless traffic at the first and the second wireless nodes; and
modifying the selected operational parameter of the first and the second wireless nodes such that both the first and second wireless nodes experience the condition or neither the first nor the second wireless node experiences the condition, wherein the selected operational parameter is modified by (1) requiring use of the virtual carrier sensing protocol at the first wireless node or at the second wireless node if the virtual carrier sensing protocol is the selected operational parameter, or (2) requiring an adjustment of the transmission power at the first wireless node or at the second wireless node if the transmission power is the selected operational parameter.

29. An access point, comprising:
at least one antenna configured to support communication with a second access point;
a processing system configured to:
acquire a first list that includes access points detected by the access point;
receive a second list from the second access point, wherein the second list includes access points detected by the second access point;
detect a condition experienced by only one of the access point and the second access point, wherein the condition is detected by determining that either (1) the first list includes the second access point and the second list does not include the access point or (2) the second list includes the access point and the first list does not include the second access point;
in response to the detected condition, select an operational parameter from a plurality of operational parameters that includes (1) virtual carrier sensing protocol and (2) transmission power, wherein the selection is based on wireless traffic at the first and second wireless nodes; and
modify the selected operational parameter of the first or the second wireless node such that both the first and second wireless nodes experience the condition or neither the first nor the second wireless node experiences the condition, wherein the selected operational parameter is modified by (1) requiring use of the virtual carrier sensing protocol at the first wireless node or at the second wireless node if the virtual carrier sensing protocol is the selected operational parameter, or (2) requiring an adjustment of the transmission power at the first wireless node or at the second wireless node if the transmission power is the selected operational parameter.

30. A station, comprising:
at least one antenna configured to support communication with a first access point and a second access point; and
a processing system configured to:
receive a first list from the first access point, wherein the first list includes access points detected by the first access point;
receive a second list from the second access point, wherein the second list includes access points detected by the second access point;
detect a condition experienced by only one of the first and the second access points, wherein the condition is detected by determining that either (1) the first list includes the second access point and the second list does not include the access point or (2) the second list includes the access point and the first list does not include the second access point;
in response to the detected condition, select an operational parameter from a plurality of operational parameters that includes (1) virtual carrier sensing protocol and (2) transmission power, wherein the selection is based on wireless traffic at the first and second wireless nodes; and
modify the selected operational parameter of the first or the second wireless node such that both the first and second wireless nodes experience the condition or neither the first nor the second wireless node experiences the condition, wherein the selected operational parameter is modified by (1) requiring use of the virtual carrier sensing protocol at the first wireless node or at the second wireless node if the virtual carrier sensing protocol is the selected operational parameter and, or (2) requiring an adjustment of the transmission power at the first wireless node or at the second wireless node if the transmission power is the selected operational parameter.

* * * * *